(12) United States Patent
Polzin et al.

(10) Patent No.: US 6,539,999 B2
(45) Date of Patent: Apr. 1, 2003

(54) APPARATUS AND METHOD FOR MAKING VARIABLE PAINT ROLLER COVERS

(75) Inventors: Bruce C. Polzin, Greendale, WI (US); Lawrence J. Bower, Jr., Milwaukee, WI (US)

(73) Assignee: Newell Operating Company, Freeport, IL (US)

( * ) Notice: Subject to any disclaimer, the term of this patent is extended or adjusted under 35 U.S.C. 154(b) by 68 days.

(21) Appl. No.: 09/788,915

(22) Filed: Feb. 19, 2001

(65) Prior Publication Data

US 2002/0112810 A1 Aug. 22, 2002

(51) Int. Cl.[7] .................... B65H 81/00; B23P 15/00
(52) U.S. Cl. .................. 156/425; 156/429; 156/432; 156/499; 156/187; 156/309.6; 29/895.211
(58) Field of Search .................. 156/425, 428–432, 156/499, 356, 359, 368, 578, 309.6, 187; 29/895.211, 895.2, 895.21

(56) References Cited

U.S. PATENT DOCUMENTS

| | | |
|---|---|---|
| 329,601 A | 11/1885 | Smith |
| 1,944,970 A | 1/1934 | Dieffenback |
| 2,255,887 A | 9/1941 | Katz |
| 2,331,969 A | 10/1943 | Friedrichs et al. |
| 2,411,842 A | 12/1946 | Adams |
| 2,422,842 A | 6/1947 | Molyneux et al. |
| 2,520,863 A | 8/1950 | Thomas et al. |
| 2,647,300 A | 8/1953 | Thomas et al. |
| 2,669,743 A | 2/1954 | Coughlan |
| 2,675,605 A | 4/1954 | Thomas |
| 2,680,873 A | 6/1954 | Ernst |
| 2,700,631 A | 1/1955 | Ferguson et al. |
| 2,708,763 A | 5/1955 | Jacoby |
| 2,789,075 A | 4/1957 | Stahl |
| 2,806,803 A | 9/1957 | Thackara et al. |

(List continued on next page.)

FOREIGN PATENT DOCUMENTS

| | | |
|---|---|---|
| BR | 8602712 | 2/1988 |
| CA | 944415 | 3/1974 |
| CA | 1102740 | 6/1981 |
| CA | 1195291 | 10/1985 |
| CA | 1330703 | * 7/1994 |

(List continued on next page.)

OTHER PUBLICATIONS

Allibert, No. 1996/5377, 6 pages (plus English translation, 6 pages).

(List continued on next page.)

Primary Examiner—Jeff H. Aftergut
(74) Attorney, Agent, or Firm—Marshall, Gerstein & Borun

(57) ABSTRACT

An apparatus and method for making a paint roller are disclosed. The apparatus includes a mandrel, a first core material strip feeder, a second core material strip feeder, a fabric cover strip feeder, a first heater, a second heater, a first liquid adhesive applicator and a second liquid adhesive applicator. The first core material strip feeder feeds a first strip of core material about the mandrel. The second core material strip feeder feeds a second strip of core material about the mandrel. The fabric cover strip feeder feeds a strip of fabric cover material about the mandrel and about at least one of the first and second strips of core material. The first and second heaters are actuatable between a first active state in which the first and second heaters apply heat to an outer surface of the first and second strips of core material, respectively, and an inactive state. The first and second liquid adhesive applicators are actuatable between a first active state in which liquid adhesive is applied to an outer surface of the first and second strips of core material, respectively, and an inactive state. The apparatus produces paint rollers having varying characteristics by selective actuation of the first and second heaters and the first and second adhesive applicators.

9 Claims, 9 Drawing Sheets

U.S. PATENT DOCUMENTS

| | | |
|---|---|---|
| 2,810,424 A | 10/1957 | Swartswelter et al. |
| 2,812,007 A | 11/1957 | Touchett et al. |
| 2,936,814 A | 5/1960 | Yakubik |
| 2,948,200 A | 8/1960 | Westerbarkey |
| 3,018,212 A | 1/1962 | Chinn |
| 3,126,306 A | 3/1964 | Sherman |
| 3,226,799 A | 1/1966 | Grodberg et al. |
| 3,232,545 A | 2/1966 | Ross et al. |
| 3,274,905 A | 9/1966 | Demsey, Jr. et al. |
| 3,366,719 A | 1/1968 | Lueders |
| 3,401,073 A | 9/1968 | Wood |
| 3,411,931 A | 11/1968 | Burns et al. |
| 3,428,239 A | 2/1969 | Wannamaker et al. |
| 3,429,522 A | 2/1969 | Cunningham et al. |
| 3,430,543 A | 3/1969 | Cunningham |
| 3,447,184 A | 6/1969 | McGinley |
| 3,457,130 A | 7/1969 | Morrison |
| 3,460,445 A | 8/1969 | Ried |
| 3,518,970 A | 7/1970 | Burns et al. |
| 3,524,779 A | 8/1970 | Masters et al. |
| 3,555,976 A | 1/1971 | Carter et al. |
| 3,563,826 A | 2/1971 | O'Neal, Jr. |
| 3,607,492 A | 9/1971 | Keith et al. |
| 3,620,869 A | 11/1971 | Stump et al. |
| 3,646,648 A | 3/1972 | Kappelman et al. |
| 3,671,373 A | 6/1972 | Grewe |
| 3,687,778 A | 8/1972 | Cichoski et al. |
| 3,700,520 A | 10/1972 | Hielema |
| 3,736,202 A | 5/1973 | Sorenson |
| 3,761,335 A | 9/1973 | Cichoski et al. |
| 3,958,311 A | 5/1976 | Küsters et al. |
| 3,960,624 A | 6/1976 | Erlandson |
| 4,010,054 A | 3/1977 | Bradt |
| 4,038,731 A | 8/1977 | Hill |
| 4,078,957 A | 3/1978 | Bradt |
| 4,121,962 A | 10/1978 | Hopkins |
| 4,165,956 A | 8/1979 | Hendy |
| 4,191,792 A | 3/1980 | Janssen |
| 4,192,697 A | 3/1980 | Parker et al. |
| 4,197,348 A | 4/1980 | Townsend |
| 4,211,595 A | 7/1980 | Samour |
| 4,338,147 A | 7/1982 | Bäckström et al. |
| 4,372,796 A | 2/1983 | Greuel, Jr. |
| 4,385,480 A | 5/1983 | Burchette, Jr. |
| 4,514,245 A | 4/1985 | Chabrier |
| 4,544,426 A | 10/1985 | Stockman |
| 4,565,595 A * | 1/1986 | Whitener .................... 156/172 |
| 4,613,474 A | 9/1986 | Donati |
| 4,689,003 A | 8/1987 | Schreiner et al. |
| 4,692,975 A | 9/1987 | Garcia |
| 4,878,976 A | 11/1989 | Asakura |
| 4,937,909 A | 7/1990 | Georgiou |
| 5,024,712 A | 6/1991 | Lecourt et al. |
| 5,106,356 A | 4/1992 | Rhodes et al. |
| 5,137,595 A | 8/1992 | Garcia |
| 5,145,543 A * | 9/1992 | Redd et al. ................. 156/172 |
| 5,146,646 A | 9/1992 | Langford et al. |
| 5,195,242 A | 3/1993 | Sekar |
| 5,206,968 A | 5/1993 | Bower et al. |
| 5,273,604 A | 12/1993 | Garcia |
| 5,294,276 A | 3/1994 | Linn et al. |
| 5,298,031 A | 3/1994 | Gabay et al. |
| 5,397,414 A | 3/1995 | Garcia et al. |
| 5,398,409 A | 3/1995 | Sekar |
| 5,468,207 A | 11/1995 | Bower et al. |
| 5,537,745 A | 7/1996 | Musch et al. |
| 5,572,790 A | 11/1996 | Sekar |
| 5,614,047 A | 3/1997 | Garcia |
| RE35,526 E | 6/1997 | Garcia |
| 5,694,688 A | 12/1997 | Musch et al. |
| 5,862,591 A | 1/1999 | Kulkaski |
| 6,145,196 A | 11/2000 | Ripstein |

FOREIGN PATENT DOCUMENTS

| | | | |
|---|---|---|---|
| CA | 1330730 | * | 7/1994 |
| CA | 2136359 | * | 5/1995 |
| DE | 499 706 | * | 5/1930 |
| DE | 1 928 269 | * | 12/1970 |
| DE | 40 07 240 | * | 10/1990 |
| DE | 40 07 204 | * | 9/1991 |
| EP | 0069335 | * | 1/1983 |
| EP | 0 494 729 | * | 7/1992 |
| EP | 0 589 305 | * | 3/1994 |
| EP | 0 744 275 | * | 11/1996 |
| ES | 2 010 431 | * | 11/1989 |
| ES | 2 020 431 | * | 8/1991 |
| FR | 1.005.324 | * | 4/1952 |
| FR | 1.107.072 | * | 12/1955 |
| FR | 1.177.381 | * | 4/1959 |
| FR | 2.093.060 | * | 1/1972 |
| GB | 585946 | * | 3/1947 |
| GB | 880395 | * | 10/1961 |
| GB | 922693 | * | 4/1963 |
| GB | 1128977 | * | 10/1968 |
| JP | 53-91544 | * | 8/1978 |
| JP | 55-19511 | * | 2/1980 |
| JP | 61-15816 | * | 4/1986 |
| JP | 63-27234 | * | 2/1988 |
| JP | 63-27238 | * | 2/1988 |
| NL | 9002017 | * | 4/1991 |
| WO | 91/02604 | * | 3/1991 |
| WO | 95/15843 | * | 6/1995 |
| WO | 96 31829 WO | | 10/1996 |
| WO | 99 04349 WO | | 1/1999 |

OTHER PUBLICATIONS

"Open Author Overview Technical White Paper"—(1998–07)–XP–002126675.

M. Vazirgiannis et al. "I–Mu.S.E.—Interactive Multimedia Scenario Editor"—Proceedings of 1998 International Workshop on Multimedia Database Management 5–7 Aug. 1998—XP002133064.

Agnew JN et al. "The Right Tool for the Job: A Quest for the Perfect Authoring Package"—Proceedings of annual conference on systems documentation—Oct. 13, 1992—XP 000579018.

International Search Report Publication No. PCT/FR 00/01950, Report dated Oct. 23, 2000.

* cited by examiner

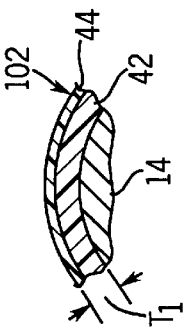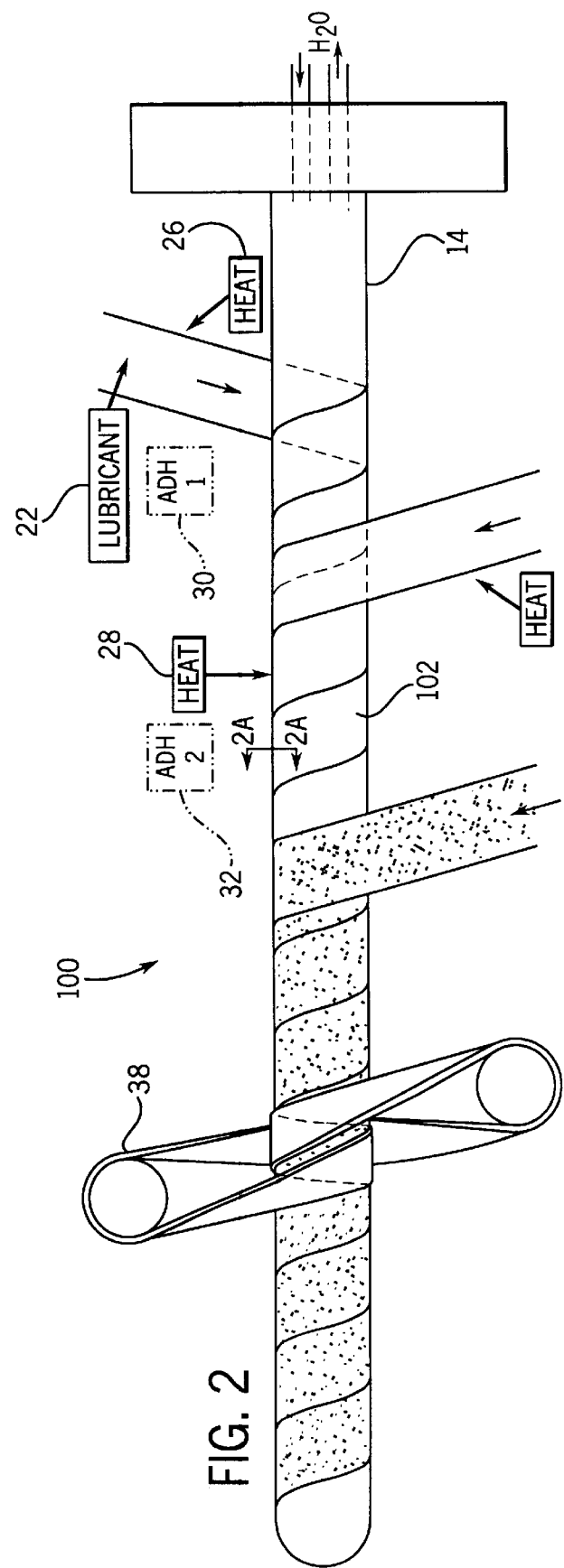
FIG. 2A
FIG. 2

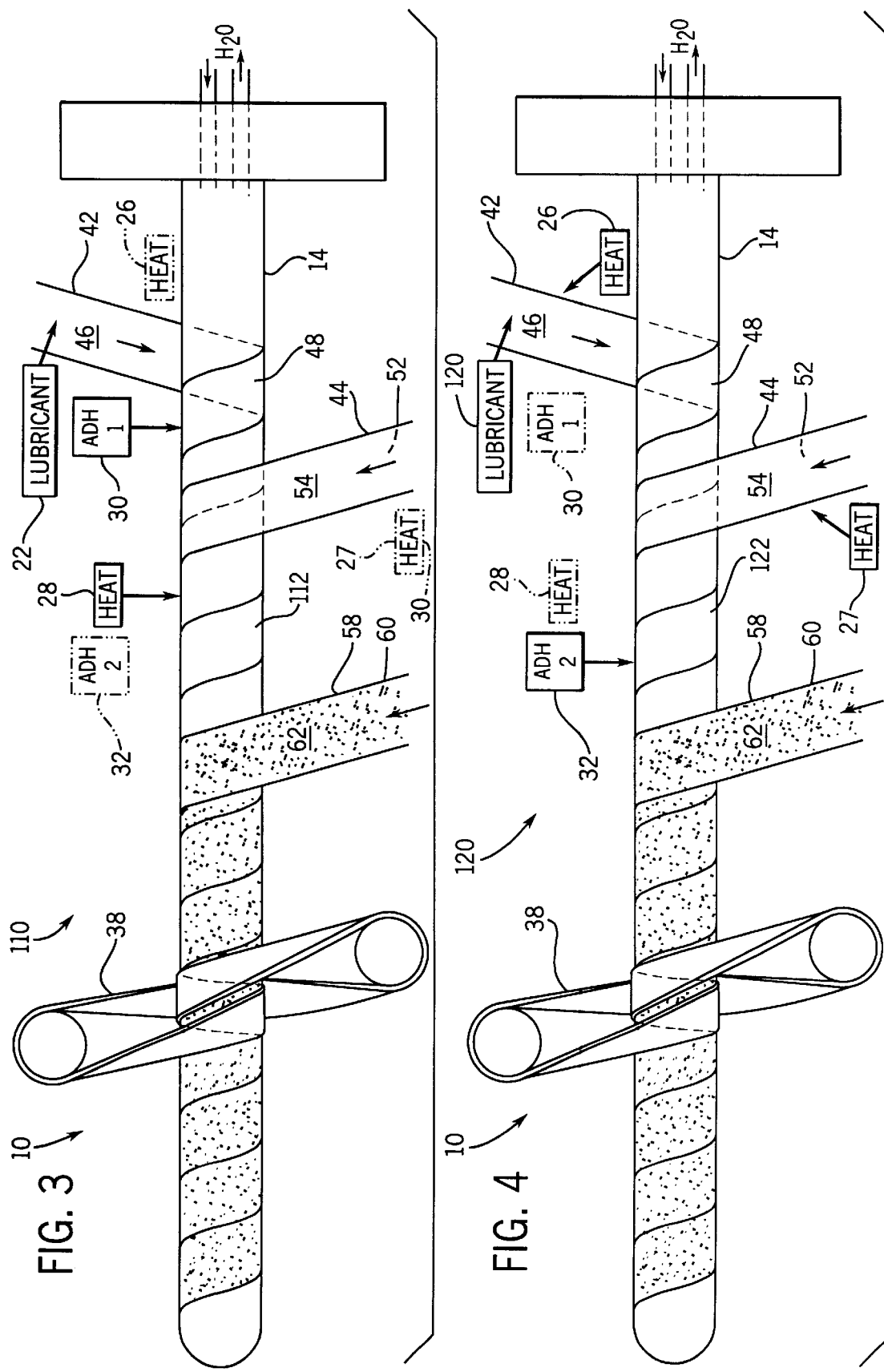

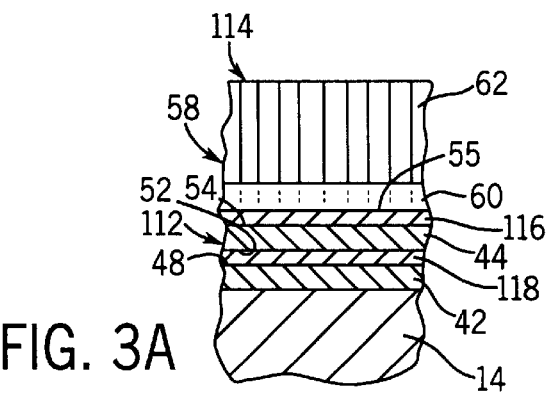
FIG. 3A
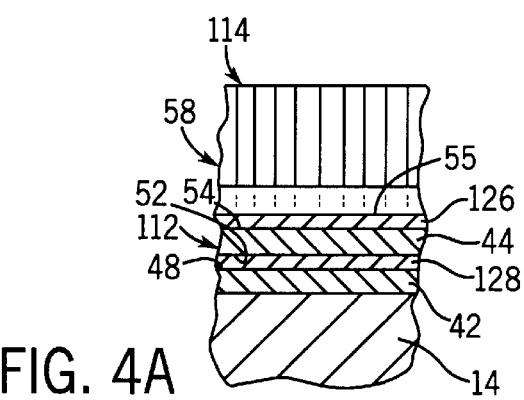
FIG. 4A
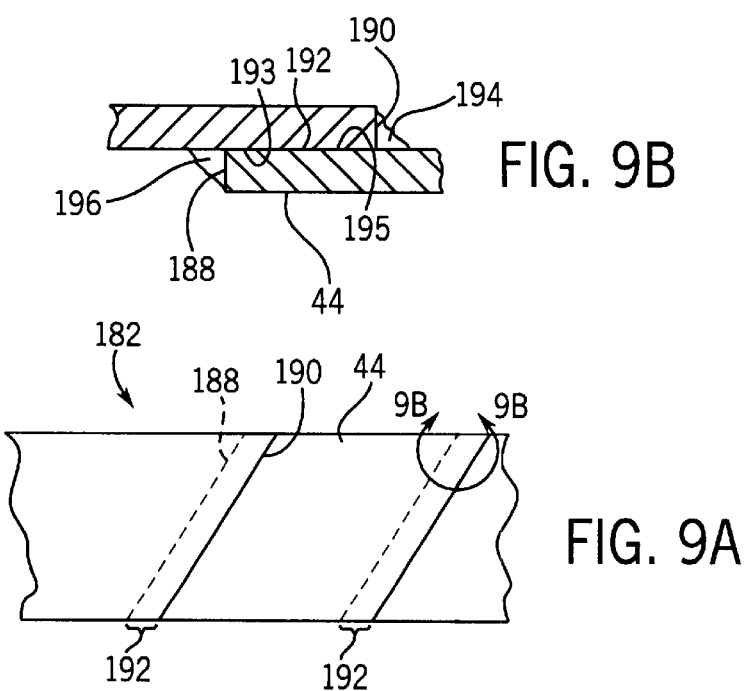
FIG. 9B
FIG. 9A

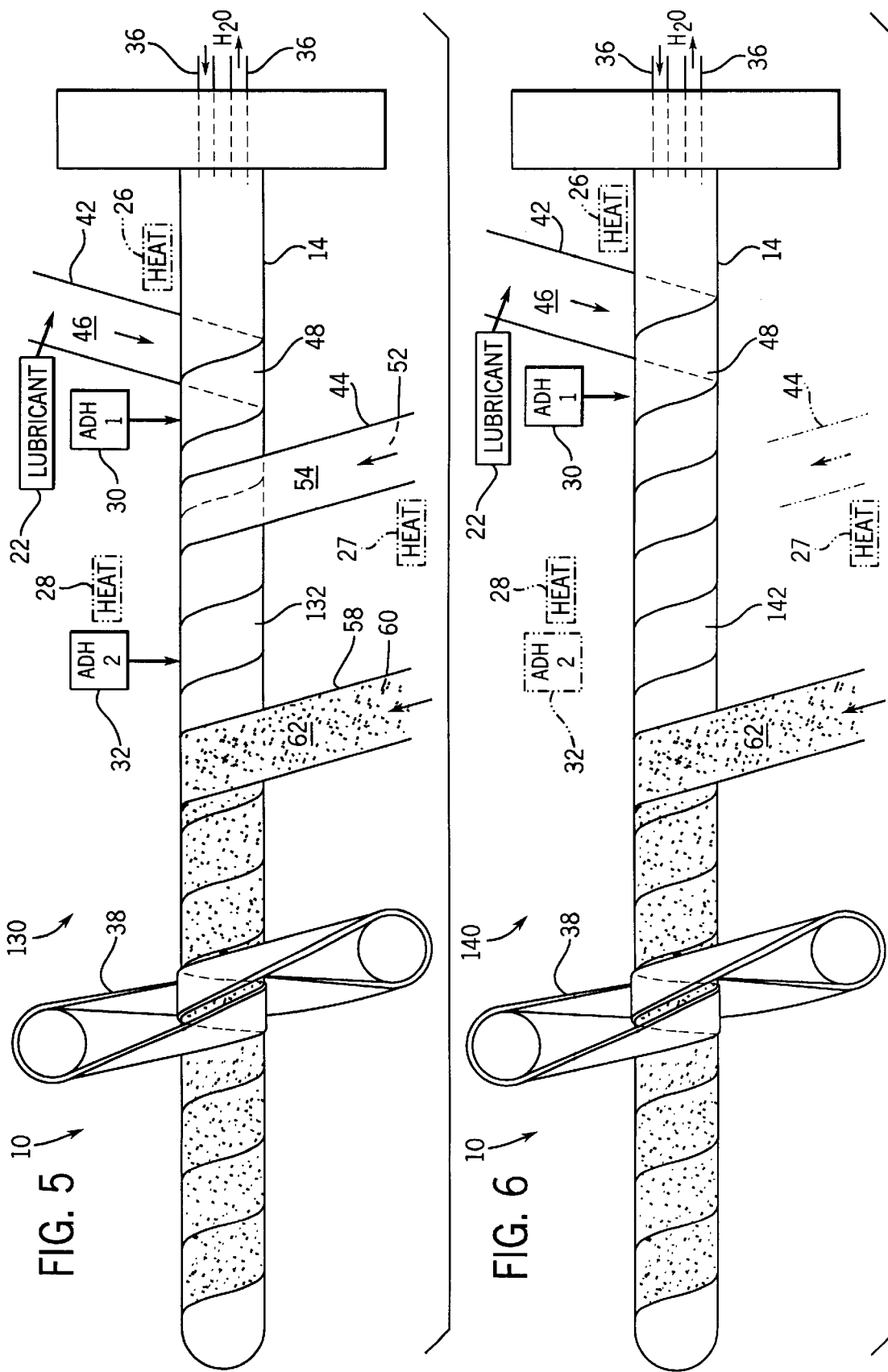

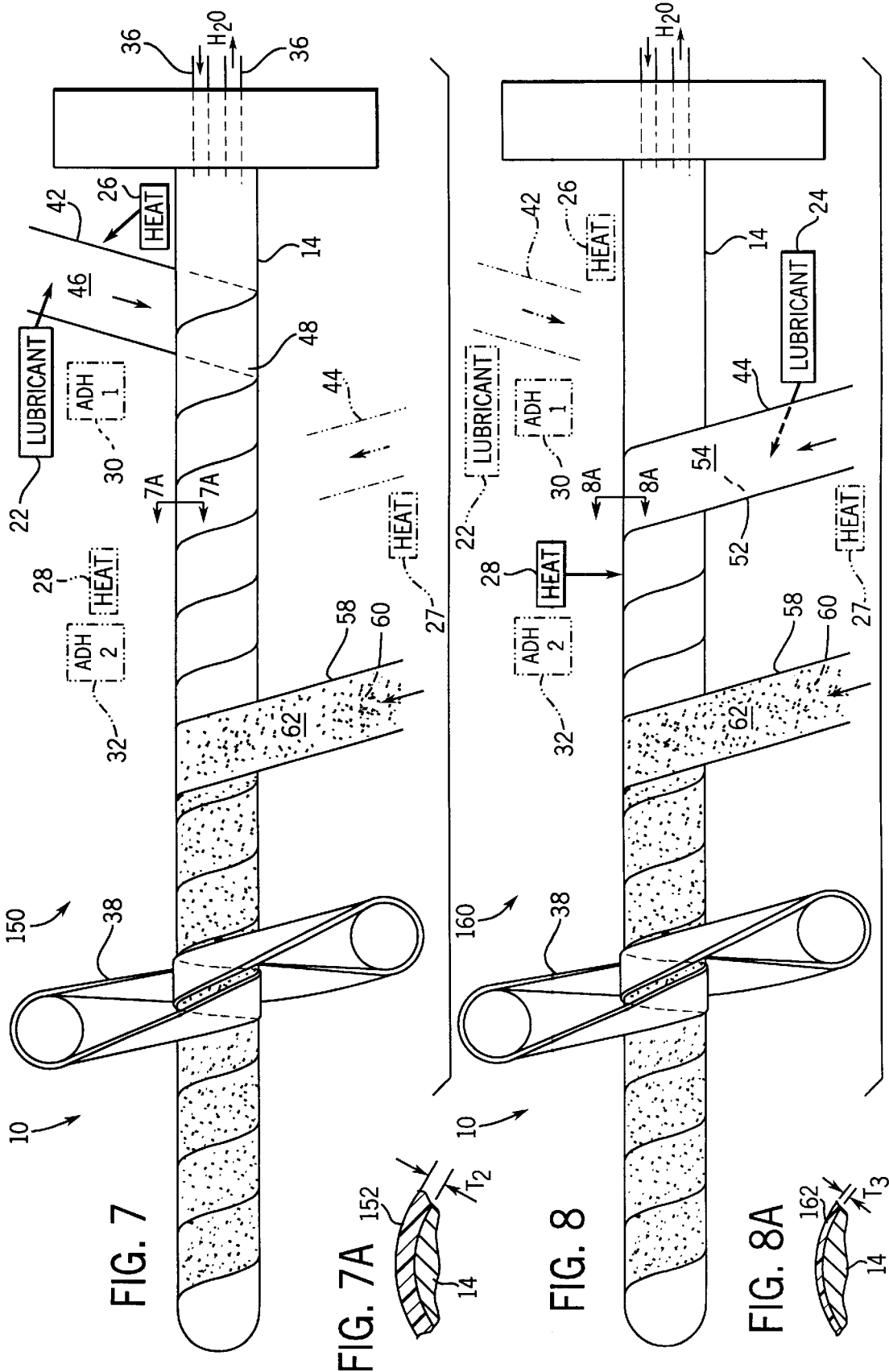

APPARATUS AND METHOD FOR MAKING VARIABLE PAINT ROLLER COVERS

FIELD OF THE INVENTION

The present invention relates to the field of paint rollers. In particular, the present invention relates to an apparatus and method for forming paint roller covers as well as any product manufactured thereby.

BACKGROUND OF THE INVENTION

Paint roller covers generally consist of a tubular core carrying a pile fabric. The tubular core is sized so as to be fitted upon a rotatably mounted cage of a paint roller. The core is typically formed from either a phenolic paper or a thermoplastic material. The cores are preferably formed from thermoplastic material that is paint solvent resistant. Such thermoplastic cores are typically either extruded or formed by bonding one or more strips of core material about a mandrel. Cores formed from strips are generally preferred due to the lower cost and continuous nature of the manufacturing process. Once the core is formed, the pile fabric is secured to the core. The pile fabric holds and retains paint or other liquid coating until the paint or liquid coating is applied to a surface such as a wall.

Paint roller covers including thermoplastic cores formed from strips of thermoplastic material are generally manufactured using one of two conventionally known methods. According to a first method, the core is formed by extruding a thermoplastic tube or by wrapping plys or strips of thermoplastic material around a mandrel preferably with an upper strip overlapping a lower strip. The opposing faces of the strips are heated so that upon contacting engagement of the strips, the heated surfaces contact one another and bond with one another. Once the core is formed, the outer surface of the core is subjected to a second application of heat to soften and melt the outer surface of the core. While in this adhesive state, a strip of fabric pile is wrapped about the core to thereby form the roller cover which is then cut, if needed, to desired lengths. An example of such a process is set forth in U.S. Pat. Nos. 5,206,968; and 5,468,207.

Although the first method produces roller covers quickly and efficiently in a continuous manner, the first method has several drawbacks. First, because the thermoplastic strips forming the core are generally heated to be bonded to one another, the plys themselves must generally have a minimum thickness. If the plys of thermoplastic material have an insufficient thickness, the heating and melting of the plys weakens the structural integrity of the strip, causing the strip to stretch and possibly break or twist. Moreover, the weakened strip weakens the resulting tubular core, subjecting the core to possible twisting as the core is moved along the mandrel.

Second, once the core is formed, the outer surface of the core must once again be heated and softened or melted to secure the fabric nap thereto. This second application of heat to the formed core subjects the core to heat distortion. If the core shrinks too much, the core may become bound about the mandrel and may be too small to fit on a roller cage. If there is overcompensation for such heat shrinkage, the core will have too large of an inner diameter and will undesirably slip when placed on the roller cage. As the thicknesses of the plys forming the core are reduced, the effects of heat distortion are magnified. As a result, it is extremely difficult to form paint roller covers having thinner, less expensive cores using the thermobond method.

Third, because the first method requires the outermost ply of the core to function as part of the core and to also function as an adhesive for adhering to the fabric backing, the material chosen for the outermost ply of the core must have both sufficient structural strength to function as a core and also must be adhesively compatible with the material of the fabric backing upon being softened or melted. As a result, the available materials used as the outermost ply of the core in the first method are extremely limited. Moreover, one of the materials chosen to optimize the structural strength of the core may not necessarily provide optimized adherence to the material of the fabric backing, and vice-versa. Thus, the first method prohibits attainment of optimal qualities of both the core and the bonding of the fabric backing to the core. Because the fabric backing itself must be adhesively compatible with the material chosen for the outer ply of the core, the type of fabric backings that can be employed in the first method is extremely limited, limiting the variety of different roller cover products that can be manufactured using the first method.

According to a second alternative method, paint roller covers are formed by wrapping one or more strips of thermoplastic strips or plys about a mandrel, applying a layer of thermoplastic polypropylene adhesive to an outer surface of the at least one ply to form the core, followed by wrapping a strip of fabric pile material over the liquid thermoplastic polypropylene and about the mandrel. In some applications, the core is formed from a single ply of thermoplastic strip material. In other applications, the core is formed from multiple strips or plys of thermoplastic material which are wrapped about the mandrel to overlap one another and which are fused to one another by liquid polypropylene applied between the strips or plys of thermoplastic material. A more detailed description of the second method is set forth in U.S. Pat. No. 5,195,242.

Although the second method is also commonly employed to manufacture paint roller covers, the second method also has associated drawbacks. Because the second method relies upon an applied liquid thermoplastic polypropylene to bond the fabric pile to the core, a controlled, consistent and reliable bond between the core and the nap is less likely to be achieved. In particular, in order to bond the core to the fabric pile, two distinct bonds must be achieved. First, the liquid thermoplastic polypropylene must bond with the underlying core. Second, the liquid thermoplastic polypropylene must bond with the backing of the fabric pile. Obtaining consistent and reliable bonds at both locations can be extremely difficult depending upon the material of the fabric pile and the underlying core.

Moreover, because the liquid thermoplastic polypropylene may not necessarily be identical to the material forming core or the material of fabric backing, structural integrity and stability are sacrificed. For example, even though if the core and applied liquid thermoplastic may both be polypropylene, polypropylenes may have different characteristics. In particular, the core material may be formed using a low melt polypropylene to provide rigidity and tensile strength while the applied thermoplastic polypropylene adhesive may comprise a high melt polypropylene for faster melting and faster processing times. To provide better structural integrity by matching the types of polypropylene used results in either lower processing times or a less rigid roller cover.

Thus, there is a continuing need for a method and an apparatus for producing a solvent resistant paint roller cover with minimal heat distortion and with more reliable bonding between the fabric pile and the underlying core. There is also a continuing need for a method and an apparatus for producing a solvent resistant paint roller cover that provides the manufacturer flexibility to vary the characteristics of the roller cover depending upon the varying requirements and uses of the roller cover by the end user.

SUMMARY OF THE INVENTION

The present invention provides an apparatus for making a paint roller. The apparatus includes at mandrel, a first core material strip feeder, a second core material strip feeder, a fabric cover strip feeder, a first heater, a second heater, a first liquid adhesive applicator and a second liquid adhesive applicator. The first core material strip feeder is actuatable between a first active state in which the feeder feeds a first strip of core material about the mandrel and a second inactive state. The second core material strip feeder is actuatable between the first active state in which the feeder feeds a second strip of core material about the mandrel and a second inactive state. The fabric cover strip feeder extends adjacent the mandrel and is configured to feed a strip of fabric cover material about the mandrel and about at least one of the first and second strips of core material. The first feeder is actuatable between a first active state in which the first heater applies heat to an outer surface of first strip of core material and a second inactive state. The second heater is actuatable between a first active state in which the second heater applies heat to an outer surface of the second strip of core material and a second active state. The first liquid adhesive applicator is actuatable between a first active state in which the liquid adhesive is applied to an outer surface of the first strip and a second inactive state. The second liquid adhesive applicator is actuatable between a first active state in which liquid adhesive is applied to an outer surface of the second strip of core material and a second inactive state. The apparatus produces paint rollers having varying core thicknesses and varying bonded ply characteristics by selective actuation of the first and second strip feeders, the first and second heaters, and the first and second adhesive applicators.

The present invention also provides an apparatus for making a paint roller that includes a mandrel, a first core material strip feeder, a second core material strip feeder, a fabric cover strip feeder, a first heater, a second heater, a first liquid adhesive applicator and a second liquid adhesive applicator. The first core material strip feeder is configured to feed a first strip of core material about the mandrel. The second core material strip feeder is configured to feed a second strip of core material about the mandrel. The fabric cover strip feeder is configured to feed a strip of fabric cover material about the mandrel and about at least one of the first and second strips of core material. The first heater is actuatable between a first active state in which the first heater applies heat to an outer surface of the first strip of core material and a second inactive state. The second heater is actuatable between a first active state in which the second heater applies heat to an outer surface of the second strip of core material and a second inactive state. The first liquid adhesive applicator is actuatable between a first active state in which the liquid adhesive is applied to an outer surface of the first strip and a second inactive state. The second liquid adhesive applicator is actuatable between a first active state in which the liquid adhesive is applied to an outer surface of the second strip of core material and a second inactive state. The apparatus is configured to produce paint rollers having varying bonded ply characteristics by selective actuation of the first and second heaters and the first and second adhesive applicators.

The present invention also provides a method for producing a paint roller. The method includes spirally wrapping a first strip of core material having an inner surface and an outer surface about a mandrel, applying heat to the outer surface of the first strip of core material such that the outer surface attains a bondable condition, spirally wrapping a second strip of core material having an inner surface and an outer surface onto the first strip of core material about the mandrel while the outer surface of the first strip is in the bondable condition, applying a liquid adhesive to the outer surface of the second strip of core material and spirally wrapping a strip of fabric cover material on the second strip of core material about the mandrel.

The present invention also provides a method for producing a paint roller that includes spirally wrapping a first strip of core material having an inner surface and an outer surface about a mandrel, applying a liquid adhesive to the outer surface of the first strip of core material, spirally wrapping a second strip of core material having an inner surface and an outer surface onto the first strip about the mandrel while the liquid adhesive is in a bondable condition, applying heat to the outer surface of the second strip of core material such that the outer surface attains a bondable condition and spirally wrapping a strip of fabric cover material on the second strip about the mandrel.

The present invention also provides a method for producing a paint roller that includes spirally wrapping a first strip of core material having an inner surface and an outer surface about the mandrel, spirally wrapping a second strip of core material having an inner surface and an outer surface onto the first strip, applying heat to at least one of the outer surface of the first strip and the inner surface of the second strip prior to wrapping the second strip over the first strip, applying a liquid adhesive to the outer surface of the second strip and spirally wrapping a strip of fabric cover material on the second strip about the mandrel.

The present invention also provides a method for producing a paint roller that includes spirally wrapping a first strip of core material having an inner surface and an outer surface about a mandrel, spirally wrapping a second strip of core material having an inner surface and an outer surface about the mandrel over the first strip of core material, applying a liquid adhesive to at least one of the outer surface of the first strip and the inner surface of the second strip prior to spirally wrapping the second strip over the first strip, applying heat to the outer surface of the second strip such that the outer surface attains a bondable condition and spirally wrapping a strip of fabric cover material on the second strip about the mandrel.

The present invention also provides a paint roller cover that includes a core and a fabric pile strip. The core has an outer circumferential surface and an inner circumferential surface. The core includes at least one ply having portions joined to one another by a first juncture. The first juncture includes one of (a) at least one adhesive and (b) a fused region. The fabric pile strip is joined to the outer circumferential surface of the core by a second juncture. The second juncture includes the other of the (a) at least one adhesive and (b) a fused region.

BRIEF DESCRIPTION OF THE DRAWINGS

FIG. 2 is a top elevational view of the apparatus of FIG. 1 in a first control setting.

FIG. 2A is a fragmentary sectional view of the apparatus of FIG. 2 taken along line 2A—2A.

FIG. 3 is a top elevational view of the apparatus of FIG. 1 in a second control setting.

FIG. 3A is an enlarged fragmentary sectional view schematically illustrating a roller cover produced by apparatus 10 in control setting 110.

FIG. 4 is a top elevational view of the apparatus of FIG. 1 in a third control setting.

FIG. 4A is an enlarged fragmentary sectional view of a roller cover produced by apparatus 10 in control setting 120.

FIG. 5 is a top elevational view of the apparatus of FIG. 1 in a fourth control setting.

FIG. 6 is a top elevational view of the apparatus of FIG. 1 in a fifth control setting.

FIG. 7 is a top elevational view of the apparatus of FIG. 1 in a sixth control setting.

FIG. 7A is a fragmentary sectional view of the apparatus of FIG. 7 taken along line 7A—7A.

FIG. 8 is a top elevational view of the apparatus of FIG. 1 in a seventh control setting.

FIG. 8A is a fragmentary sectional view of the apparatus of FIG. 8 taken along line 8A—8A.

FIG. 9A is a fragmentary side elevational view of an alternative roller cover core produced by apparatus 10.

FIG. 9B is an enlarged fragmentary sectional view of an alternative embodiment of the roller cover core of FIG. 9A taken along line 9B—9B.

DETAILED DESCRIPTION OF THE PREFERRED EMBODIMENTS

Figure 1:
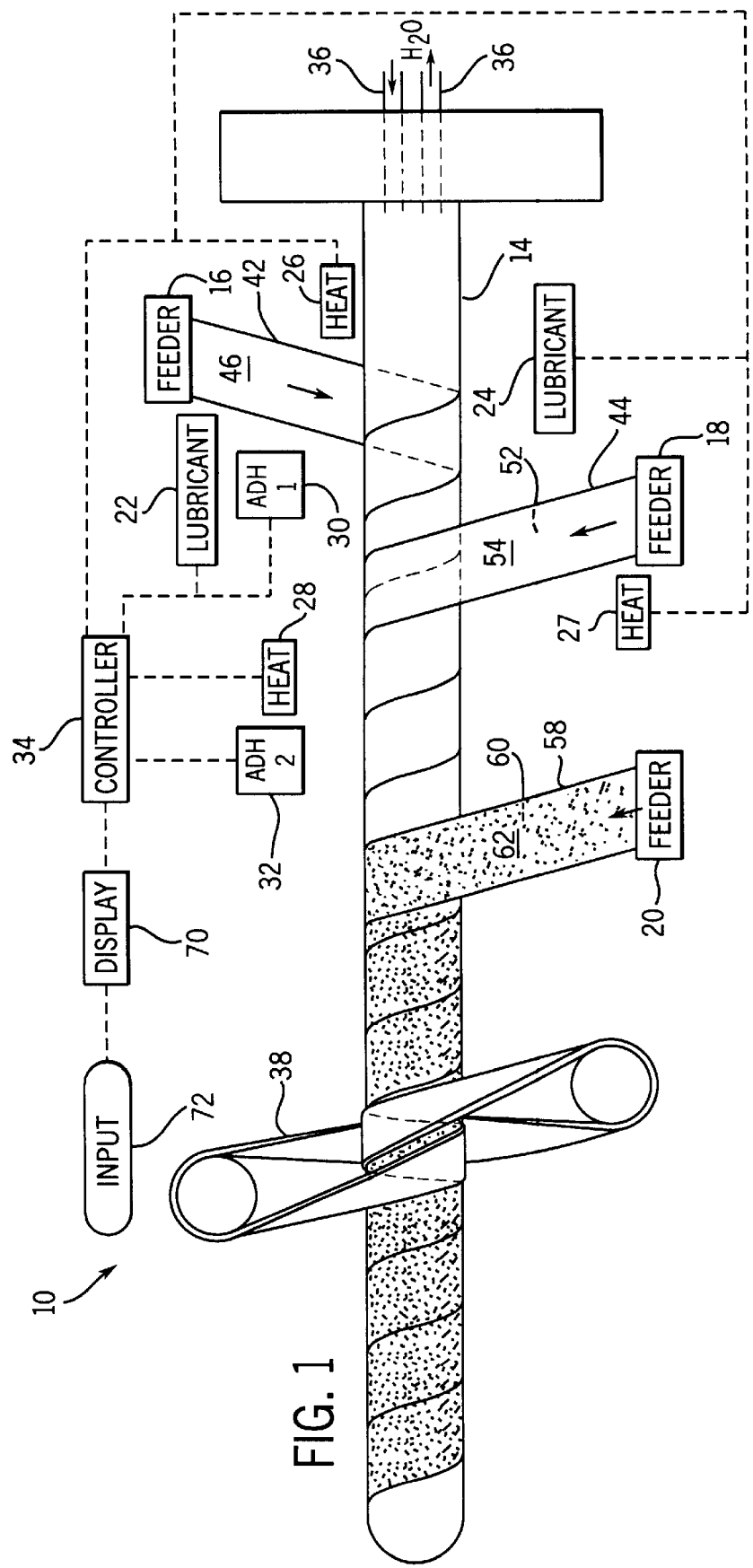
FIG. 1 is a top elevational view schematically illustrating an exemplary embodiment of an apparatus of the present invention.

FIG. 1 is a top elevational view schematically illustrating apparatus 10 for manufacturing paint roller covers adapted to be mounted upon a cage of a paint roller. Apparatus 10 generally includes mandrel 14, core material strip feeder 16, core material strip feeder 18, fabric cover strip feeder 20, lubricant applicator 22, lubricant applicator 24, heater 26, heater 27, heater 28, adhesive applicator 30, adhesive applicator 32, and controller 34. Mandrel 14 comprises a conventionally known stationary mandrel providing an outer circumferential surface about which the roller cover is formed. In the exemplary embodiment, mandrel 14 has an outer diameter which tapers to the left as seen in FIG. 1 to accommodate shrinkage of the core formed thereabout and to prevent binding. Mandrel 14 preferably includes internal conduits 36 axially extending along the length of mandrel 14 and enabling cooling fluid such as water to pass therethrough to cool the formed roller cover. Because mandrel 14 preferably comprises a stationary mandrel, apparatus 10 additionally includes a conventional drive such as Ford drive 38 configured to axially drive the strips of material forming the roller cover axially along mandrel 14. As will be appreciated, apparatus 10 may alternatively be configured to drive the strips and the formed roller cover axially along mandrel 14 by various other means. For example, mandrel 14 may alternatively comprise a rotating mandrel. Moreover, each of the components of apparatus 10 may alternatively be configured to move along the axis of mandrel 14. Further, the components of apparatus 10 may alternatively be configured to move about the axis of mandrel 14 so as to wrap the strips of material to form the paint roller cover.

Core material strip feeder 16 is situated proximate to mandrel 14 and is actuatable between an active state and an inactive state. In the active state, feeder 16 feeds and guides strip 42 about mandrel 14. In particular, strip 42 has an inner surface 46 and an outer surface 48. Outer surface 48 of strip 42 preferably includes a thermoplastic material such as polypropylene. In the exemplary embodiment, the entirety of strip 42 is formed from a thermoplastic material such as polypropylene. In lieu of including polypropylene, strip 42 may alternatively include other thermoplastic materials such as polyethylene, a mixture of polyethylene and polypropylene, polyethylene with added talc, polyester and other plastics. Strip 42 may alternatively be formed from a combination of thermoplastic materials and non-thermoplastic materials, including thermoset materials. Although strip thickness can be chosen to suit the product and market needs, in the illustrated embodiment, strip 42 has a thickness of approximately 0.012 inches.

Feeder 16 supplies strip 42 to mandrel 14 such that inner surface 46 contacts and slides along mandrel 14. Preferably, strip 42 is helically wound or wrapped about mandrel 14 with successive turns in a closely-spaced manner. Alternatively, adjacent edges may be abutting or overlapping. In the inactive state, the supply of strip 42 to mandrel 14 is cessated. In the exemplary embodiment, feeder 16 is manually actuated between the active state and inactive state by an operator manually feeding an end of strip 42 spirally about mandrel 14 until drive 38 engages strip 42. Feeder 16 is manually actuated to the inactive state by simply severing the supply of strip 42. In an alternative embodiment, feeder 16 is actuated between the active and inactive states in response to control signals from controller 34. In such an alternative embodiment, feeder 16 includes a mechanically actuated structure that positions strip 42 against and/or partially about mandrel 14 until strip 42 is engaged by drive 38 or until strip 42 is sufficiently held by mandrel 14 so as to be wrapped about mandrel 14 as in the case with an alternative rotating mandrel 14.

Core material strip feeder 18 is similar to core material feeder 16 and is situated proximate to mandrel 14. Feeder 18 is actuatable between an active state and inactive state. In the active state, feeder 18 supplies strip 44 to mandrel 14. Similar to strip 42, strip 44 has an inner surface 52 and an opposite outer surface 54. Inner surface 52 and outer surface 54 of strip 44 preferably include a thermoplastic material such as polypropylene. In the exemplary embodiment, the entirety of strip 44 is formed from a thermoplastic material such as polypropylene. In lieu of including polypropylene, strip 44 may alternatively include other thermoplastic materials such as polyethylene, a mixture of polyethylene and polypropylene, polyethylene with added talc, polyester and other plastics. Alternatively, strip 44 may comprise a composite including a lower layer of thermoplastic or thermoset material and an overlaying upper layer of paper or metal. Strip 44 may comprise any of a multitude of a number of layers having the desired characteristics of the roller cover being manufactured. For example, strip 44 may alternatively comprise a polypropylene layer, a paper layer and a metal foil layer, and the like. In the illustrated embodiment, strip 44 has a thickness of approximately 0.024 inches.

Feeder 18 feeds strip 44 to mandrel 14 such that strip 44 is spirally wrapped over strip 42 with inner surface 52 of strip 44 abutting outer surface 48 of strip 42. Preferably, strip 44 is helically wound or wrapped about mandrel 14 with successive turns in a closely-spaced manner. Alternatively, adjacent edges may be abutting or overlapping. In one exemplary embodiment, strip 44 overlaps strip 42 by approximately one-third to two-thirds of the width of strip 42. The width of each strip 44 is largely dictated by the desired core diameter. In the exemplary embodiment, each strip has a width of approximately 2 ¾ inches. Due to the greater internal diameter of strip 44 wound about the mandrel, its width is preferably slightly greater than the width of strip 42, as for example, on the order of about 1%. As will be appreciated, the exact amount of increased width is determined by the thickness of the strips and the angle of feed to the mandrel as well as the inherent requirements of each installation to produce a smooth surface, all of which are determined by adjustments as will be apparent to those skilled in the art. In the inactive state, the supply of strip 44 from feeder 18 is cessated. In the exemplary embodiment, feeder 18 is manually actuated to the active state by an operator manually spirally wrapping an end of strip 44 about mandrel 14 until strip 44 is engaged by drive 38. Feeder 18 is actuated to the inactive state by the operator manually severing the supply of strip 44 from feeder 18.

Feeder 20 comprises a conventionally known feeder configured to feed and guide strip 58 of fabric cover material generally including a substrate or backing 60 supporting a natural or synthetic liquid absorbent or liquid carrying material 62. In the exemplary embodiment, backing 60 comprises a thermoplastic material while material 62 comprises a fabric nap or pile of material such as polyester. Although less desirable, various other materials may be used such as nylon, acrylic, foam, mohair, sponge and the like. Feeder 20 is configured to guide and feed strip 58 to mandrel 14 such that strip 58 is spirally wrapped about mandrel 14 with backing 60 contacting outer surface 54 of strip 44 or outer surface 48 of strip 42 depending on the particular desired roller cover.

Lubricant applicators 22 and 24 comprise fluid applicators situated proximate to mandrel 14 and the supply of strips 42, 44, respectively. Applicators 22 and 24 are each actuatable between an active state and an inactive state. In the active state, applicators 22 and 24 are configured to supply a lubricating fluid, such as a soapy water solution, to inner surface 46 of strip 42 and inner surface 52 of strip 44, respectively. In the exemplary embodiment, applicators 22 and 24 are configured to supply lubricating fluid directly to surfaces 46 and 52. Alternatively, applicators 22 and 24 may be configured to supply lubricating fluid indirectly to such surfaces by first applying the lubricating fluid to the outer surface of mandrel 14 which is then brought into contact with such inner surfaces. The lubricating fluid supplied to inner surface 46 of strip 42 reduces friction between strip 46 and mandrel 14 to facilitate movement of strip 42 axially along mandrel 14. Likewise, the supply of lubricating fluid to inner surface 52 of strip 44 reduces friction between inner surface 52 of strip 44 and mandrel 14 and facilitates movement of strip 44 axially along mandrel 14 when the supply of strip 42 is cessated such that inner surface 52 of strip 44 abuts mandrel 14.

Heater 26 comprises a gas ribbon burner or flame heater situated proximate to mandrel 14. In lieu of comprising a flame heater, heater 26 may alternatively comprise any of a variety of devices configured to apply heat to a surface so as to at least partially melt or soften a thermoplastic material of the surface. Heater 26 is actuatable between an active state and an inactive state. Heater 26 preferably actuates between the active state and the inactive state in response to control signals from controller 34. In the active state, heater 26 is configured to apply heat to outer surface 48 of strip 42 to elevate the temperature of surface 48 to a point above a melting point of the thermoplastic material. As a result, the thermoplastic material becomes softened or at least partially melted to enable surface 48 to become fused with inner surface 52 of strip 44 prior to the softened or melted thermoplastic material cooling and solidifying.

Heater 27 comprises a flame heater situated proximate to mandrel 14 and proximate to feeder 18. In lieu of comprising a flame heater, heater 27 may alternatively comprise any of a variety of devices configured to apply heat to a surface so as to at least partially melt or soften a thermoplastic material of the surface. Heater 27 preferably actuates between an active state and an inactive state in response to control signals from controller 34. In the active state, heater 27 applies heat to inner surface 52 of strip 44 so as to elevate a temperature of the inner surface 52 above a melting point of the thermoplastic material. By melting or softening the thermoplastic material of inner surface 52, heater 27 further enhances bonding between surface 52 of strip 44 and surface 48 of strip 42. Although less desirable, one of heaters 26, 27 may be eliminated. Moreover, in lieu of being actuated between the active state and the inactive state in response to control signals from controller 34, heaters 26 and 27 may alternatively be configured to be directly manually actuated between the active state and the inactive state.

Heater 28 comprises a gas ribbon burner or flame heater situated proximate to mandrel 14 and proximate to strip 44 about mandrel 14. In lieu of comprising a flame heater, heater 28 may alternatively comprise any of a variety of devices configured to apply heat to a surface so as to at least partially melt or soften a thermoplastic material of the surface. Heater 28 is actuatable between an active state and an inactive state. Preferably, heater 28 actuates between the active state and the inactive state in response to control signals from controller 34. In the active state, heater 28 is configured to apply heat to outer surface 54 of strip 44 to elevate a temperature of outer surface 54 above a melting point of the thermoplastic material of outer surface 54. By softening or melting the thermoplastic material of outer surface 54, heater 28 facilitates integral bonding between strip 44 and backing 60 of strip 58. Although less desirable, heater 28 may alternatively apply heat to backing 60 of strip 58 so as to melt or soften backing 60 for bonding to strip 44. Although not specifically illustrated, apparatus 10 may additionally include a heater configured to additionally heat backing 60 of strip 58 to facilitate bonding to strip 44. Furthermore, although less desirable, heater 28 may alternatively be directly manually actuatable between the active state and the inactive state.

In the inactive state, each of heaters 26, 27 and 28 either apply no heat to the respective surfaces or merely apply a limited amount of heat so as to elevate the temperature of the respective surface to a maximum temperature below the melting or softening point of the material of the respective surface. For example, in particular control settings where adhesive is applied to the respective surface and where the adjacent preceding heater is in the "inactive" state, it may be beneficial to preheat the respective surface with the heater to a temperature below the melting point of the respective surface but sufficiently elevated to maintain the thin outer skin of the liquid adhesive being applied to the surface in a molten state such that the liquid adhesive wets out and forms a better bond to the surface.

Adhesive applicators 30 and 32 are situated proximate to mandrel 14 and are configured to apply liquid adhesive, such as polypropylene, to strips 42 and 44, respectively. In lieu of polypropylene, other liquid thermoplastic adhesives may be utilized such as polyethylene, a mixture of polypropylene and polyethylene, one preferred mixture having a polypropylene: polyethylene ratio of about 80:20, polyamide or a mixture of polyamides, polyolefin-based components, polyester-based compounds, thermoplastic polyurethane-based compounds, polyamide "hot melt" adhesives sold under the designations HB Fuller 6542-PEL and HL 2021 and Hot Melt 2067PL, as well as other suitable adhesives compatible with the thermoplastic material of strips 42, 44. The thermoplastic adhesive is preferably compatible with the thermoplastic material of strips 42, 44 and backing 60 of fabric strip 58 in the anticipated solvents used in connection with paint. These solvents include water, water with ammonia, soapy water, mineral spirits, turpentine, aromatic compounds, aliphatic compounds, alcohols, key tones, acetone, toluene, chlorinated hydrocarbons and other solvents foreseeably used with paint, including both water and oil-based paints, shellac and varnish. Although less desirable due to bonding difficulties, thermoset adhesives may be employed in lieu of thermoplastic adhesives. In such cases, the surfaces to which the thermoset adhesive is applied is preferably treated to alter its surface bonding characteristics. The adhesive applied by each of applicators 30 and 32 is applied through a conventionally known nozzle connected to a conventionally known reservoir where the thermoplastic adhesive is heated.

Adhesive applicator 30 is actuatable between an active state and an inactive state. Adhesive applicator 30 preferably actuates between the active state and the inactive state in response to control signals from controller 34. Alternatively, applicator 30 may be directly manually actuated between the active state and the inactive state. In the active state, adhesive applicator 30 applies a liquid thermoplastic material, such as liquefied polypropylene, to outer surface 48 of strip 42 such that strip 42 may be fused with strip 44. Because the liquid adhesive preferably comprises polypropylene or another thermoplastic adhesive that is compatible with the thermoplastic material of outer surface 48 of strip 42 and inner surface 52 of strip 44, a stronger bond between strips 42 and 44 is achieved. In lieu of applying liquid adhesive to outer surface 48 of strip 42, adhesive applicator 30 may alternatively apply the liquid adhesive to inner surface 52 of strip 44 or to both outer surfaces 48 and inner surface 52 of strips 42 and 44, respectively.

Adhesive applicator 32 is situated proximate to mandrel 14 and is also actuatable between an active state and an inactive state. Adhesive applicator 32 preferably actuates between the active state and the inactive state in response to control signals from controller 34. Alternatively, adhesive applicator 32 may actuate between the active state and the inactive state under the direct manual control from an operator. In the active state, adhesive applicator 32 is configured to apply liquid adhesive to outer surface 54 of strip 44 in sufficiently close axial proximity to feeder 20 such that the liquid adhesive has not yet solidified or set when feeder 20 wraps strip 58 over surface 54. In the exemplary embodiment, adhesive applicator 32 is configured to apply a liquid thermoplastic adhesive, such as liquid polypropylene, which is both compatible with the thermoplastic material of outer surface 54 and backing 60. As described in greater detail with respect to FIG. 7, adhesive applicator 32 is also configured to apply liquid adhesive to outer surface 48 of strip 42 when feeder 18 is in the inactive state and strip 44 is no longer being supplied to and wrapped about mandrel 14. In the inactive state, adhesive applicator 32 does not apply liquid adhesive.

Controller 34 comprises a conventionally known programmed logic control circuit electrically coupled to lubricant applicators 22, 24; heaters 26, 27, 28; and adhesive applicators 30, 32. Controller 34 is configured to generate control signals which are transmitted to and which cause lubricant applicators 22, 24; heaters 26, 27, 28; and adhesive applicators 30, 32 to actuate between the active state and the inactive state. In the exemplary embodiment, controller 34 is additionally configured to control valves or other similar structures situated between adhesive sources and the adhesive applicators to automatically control and select the type of adhesive being supplied to each individual adhesive applicator depending upon the materials of the fabric pile strip and the core. In the exemplary embodiment, controller 34 is also configured to selectively control the amount and/or duration of heat applied by heaters 26, 27 and 28 based upon the materials of the core and fabric ply, including the thickness of the materials. In lieu of comprising a programmed logic control circuit, controller 34 may comprise other conventionally known hardware and software driven controllers. By selectively actuating lubricant applicators 22, 24; heaters 26, 27, 28; and adhesive applicators 30, 32 between the active and inactive states, controller 34 enables apparatus 10 to quickly and easily switch production between variable paint rollers having varying core thicknesses and varying bonded ply characteristics by simply selecting one of a plurality of predetermined control settings of controller 34 and by manually actuating feeders 16 and 18 as appropriate as described in greater detail with reference to FIGS. 2–9.

In the exemplary embodiment, controller 34 preferably includes a display 70 and an input 72 for selecting the predetermined control settings. Depending upon the control setting chosen, the display 70 additionally instructs the operator to manually actuate feeders 16, 18 between the active and inactive states. In the exemplary embodiment, input 72 comprises a conventionally known touch screen on the display 70 itself to allow the operator to select the desired roller cover characteristics by pressing particular portions of the screen corresponding to pictorial representations or alphanumeric descriptions on the touch screen.

FIG. 2 illustrates one particular control setting 100 which produces a paint roller having a core 102 shown in FIG. 2A about mandrel 14. As shown by FIG. 2, in control setting 100, controller 34 (shown in FIG. 1) has generated control signals, in a conventionally known manner, which cause lubricant applicator 22 and heaters 26, 27 and 28 to actuate to active states. Feeders 16, 18 (shown in FIG. 1) are also in the active state. At the same time, the control signal generated by controller 34 causes lubricant applicator 24 (shown in FIG. 1) and adhesive applicators 30, 32 to actuate to the inactive state. As a result, in control setting 100, lubricant applicator 22 applies lubricating fluid to inner surface 46 of strip 42 while lubricant applicator 24 is shut down and/or withdrawn so as to not apply lubricating fluid to inner surface 52 of strip 44. Heaters 26 and 27 apply heat to surfaces 48 and 52 of strips 42 and 44, respectively, while adhesive applicators 30, 32 are shut down and/or withdrawn from surfaces 48 and 54 of strips 42 and 44, respectively. As a result, heaters 26 and 27 at least partially melt the thermoplastic material on surfaces 48 and 52 to fuse strips 42 and 44 to one another about mandrel 14 to form core 102. As shown by FIG. 2A, core 102 has a wall thickness T1 provided by the combined thicknesses of strips 42 and 44. The relatively large thickness of core 102 provides the roller cover, produced by apparatus 10 in control setting 100, with increased rigidity and durability for higher cost and higher quality paint rollers.

As further shown by FIG. 2, heater 28 is in the active state while adhesive applicator 32 is in the inactive state by being shut down and/or withdrawn away from mandrel 14. Heater 28 heats surface 54 of strip 44 so as to melt the thermoplastic material in surface 54 such that the surface attains a bondable state. While surface 54 is in the bondable state, feeder 20 supplies strip 58 to mandrel 14 such that strip 58 becomes spirally wrapped over surface 54, allowing the thermoplastic material of surface 54 to fuse with the compatible backing 60 of strip 58. As a result, in control setting 100, apparatus 10 produces an integral paint roller having a relatively thick core 102 with a thickness T1 with associated higher quality and higher cost.

FIG. 3 depicts apparatus 10 with controller 34 (shown in FIG. 1) in control setting 110. In control setting 110, feeders 16, 18, lubricant applicator 22 and adhesive applicator 30 are in active states while heaters 26 and 27 are in inactive states in which heaters 26 and 27 are shut down and/or withdrawn so as to not apply heat to strips 42 and 44, respectively. Lubricant applicator 24 is also in the inactive state. Lubricant applicator 24 is also in an inactive state in which lubricant applicator 24 is shut down and/or withdrawn so as to not apply a lubricating fluid. As shown by FIG. 3, lubricant applicator 22 applies lubricating fluid to surface 46 of strip 42. Adhesive applicator 30 applies a liquid adhesive, preferably a liquid thermoplastic adhesive such as liquid polypropylene, to surface 48 of strip 42 in sufficient quantity and at appropriate locations such that strip 44 adheres to strip 42 when wrapped over strip 42. In the exemplary embodiment, surfaces 48 and 52 of strips 42 and 44 are formed from a material compatible with the liquid adhesive applied by adhesive applicator 30. Preferably, surfaces 48 and 52 include a thermoplastic material such as polypropylene, wherein the liquid adhesive applied by applicator 30 also comprises a liquid thermoplastic material such as polypropylene. Alternatively, surfaces 48 and 52 include different materials at least partially incompatible with one another, wherein the liquid adhesive applied by applicator 30 is compatible with each of the materials of surfaces 48 and 52. Compatibility generally means the ability of different materials to melt or fuse to one another without intermediate adhesives. For example, polypropylene is not very compatible with vinyl or nylon or acrylic. Because liquid adhesive is used to adhere strips 42 and 44 to one another in lieu of heat such as in control setting 100, strips 42 and 44 are not subjected to high heats required to otherwise melt surfaces 48 and 52. Because strips 42 and 44 are not subjected to high heat prior to being adhered to one another to form a single or an integral core, strips 42 and 44 are less subject to heat distortion as they are being wrapped about mandrel 14.

As further shown by FIG. 3, in control setting 110, heater 28 is in the active state and adhesive applicator 32 is in the inactive state in which adhesive applicator 32 is shut down and/or withdrawn. Heater 28 applies heat to surface 48 to at least partially melt the thermoplastic material of surface 48 such that surface 48 attains a favorable condition. Heater 28 applies sufficient heat to surface 48 in sufficient proximity to the provision of strip 58 such that backing 60 becomes fused to surface 54 when wrapped about surface 54 and mandrel 14. Because heater 28 melts at least a portion of surface 54 to fuse the core formed by strips 42 and 44 to strip 58 of pile fabric, only a single bonding site at the interface of surface 54 and backing 60 is necessary to secure strip 58 to surface 54. As a result, the pile fabric of strip 58 is secured to the core formed by strips 42 and 44 with better controlled, more consistent, and more reliable bonds. Overall, in control setting 110, apparatus 10 produces a paint roller having a core 112 made with minimal heat distortion and better controlled bonding between the core 112 and the pile fabric strip 58.

FIG. 3A is a schematic fragmentary sectional view of roller cover 114 formed by apparatus 10 in control setting 110. FIG. 3A illustrates roller cover 114 prior to removal of roller cover 114 from mandrel 14. As shown by FIG. 3A, roller cover 114 includes strip 58 and core 112. As mentioned previously, strip 58 generally includes backing 60 and liquid absorbent or liquid carrying material 62. In the exemplary embodiment shown in FIG. 3A, backing 60 comprises a pile fabric stabilized by a backing of yarns. Material 62 preferably comprises a pile of polyester face yarns which are attached to backing 60 which may include polyester. Strip 58 is secured to core 112 by juncture 116.

Core 112 generally includes two layers or plies formed by strips 42 and 44 joined to one another by juncture 118. In the embodiment illustrated in FIG. 3A, strips 42 and 44 have opposing surfaces 48 and 52, respectively, including different material compositions such as paper and plastic or metal and plastic, and the like. In the exemplary embodiment, surfaces 48 and 52 include materials that are incompatible with one another. As used herein, the recitation that the materials are "incompatible" generally means that the materials do not and cannot melt and fuse to one another. For example, nylon is not compatible with polypropylene. Acrylic is only partially compatible with polypropylene. In lieu of being partially or completely incompatible with one another, the materials forming surfaces 48 and 52 of strips 42 and 44, respectively, may have different melting and rigidity characteristics. For example, one of surfaces 48 and 52 may include a material requiring lesser heat (temperature or time) due to a low melt temperature or less material, allowing faster processing time, while the other of surfaces 48 and 52 includes a material requiring greater heat (temperature or time) due to a higher melt temperature or more material, but greater rigidity so as to provide core 112 with greater structural strength. In each of the aforementioned circumstances, surfaces 48 and 52 of strips 42 and 44 either: (1) cannot fuse to one another, (2) fuse to one another with weaker bonds due to limited compatibility, or (3) may only be fused to one another with either (a) increased processing times resulting from the use of a more rigid material having a higher melt point or (b) structurally weaker roller cover cores resulting from the use of a material having a higher melting temperature but less strength or rigidity. In one exemplary embodiment, surfaces 48 and 52, as well as the entirety of each of strips 42 and 44 are formed from ethylene and propylene, respectively.

Junctures 116 and 118 join strips 42, 44 and 58. Juncture 118 comprises a layer of adhesive sandwiched between surfaces 48 and 52 of strips 42 and 44. Juncture 118 has two distinct bonding sites on its opposite sides. On one side, juncture 118 bonds with strip 42 and on an opposite side, juncture 118 bonds with strip 44. Juncture 118 preferably comprises an adhesive material that is at least partially compatible with the materials of both surfaces 48 and 52. In one exemplary embodiment, surfaces 48 and 52 include polypropylene and nylon, respectively. Juncture 11 8 includes a polypropylene-based material having additives enabling the material to bond both with the polypropylene and the nylon contained in surfaces 48 and 52. An example of such a material is modified SANTOPRENE sold by Advanced Elastomer Systems under a license from Monsanto and is generically known as a thermoplastic rubber. Juncture 118 is formed between surfaces 48 and 52 of strips 42 and 44 by the application of the adhesive material by adhesive applicator 30 (shown in FIG. 3). Juncture 118 enables surfaces 48 and 52 of strips 42 and 44, respectively, to include different or even incompatible materials to attain optimized characteristics for core 112.

Juncture 116 joins strip 58 to the outer circumferential surface of core 112. In contrast to juncture 118, juncture 116 constitutes a fused region between the lower surface of backing 60 and surface 54 of strip 44. As used herein, the term "fused region" means a region between two adjacent originally distinct layers wherein materials from the adjacent layers have melted together to unite or blend with one another into a single unitary structure composed solely of material contributed from the adjacent layers. Although juncture 116 requires that the adjacent layers be at least partially compatible, juncture 116 provides a single unitary structure between strip 44 and backing 60 along a single bonding site. Juncture 116 is formed by the application of heat to one or both of strip 44 and backing 60 so as to raise the temperatures to a point above the melting points of such adjacent materials. The application of heat is preferably performed by heater 28 (shown in FIG. 3). Overall, junctures 116 and 118 enable roller cover 114 to have core 112 formed from different materials for optimized characteristics while at the same time providing roller cover 114 with a more reliable, controlled and consistent solvent resistant bond between core 112 and strip 58 of liquid carrying material.

FIG. 4 depicts apparatus 10 with controller 34 (shown in FIG. 1) in control setting 120. In control setting 120, feeders 16, 18 (shown in FIG. 1) lubricant applicator 22 and heaters 26, 27 are in active states while adhesive applicator 30 is in an inactive state in which adhesive applicator 30 is shut down and/or withdrawn. Lubricant applicator 24 is also in the inactive state. As shown by FIG. 4, lubricant applicator 22 applies lubricating fluid to surface 46 of strip 42. Heaters 26 and 27 apply heat to surfaces 48 and 52 of strips 42 and 44 so as to soften or at least partially melt at least portions of surfaces 48 and 52 such that strip 44 fuses to strip 42 when wrapped over strip 42 to form the core. Because surfaces 48 and 52 are melted and fused to one another rather than being fused to one another by an applied intermediate liquid adhesive, only a single bond site is required. As a result, the bond between strips 42 and 44 is better controlled, more consistent and more reliable.

As further shown by FIG. 4, in control setting 1 20, adhesive applicator 32 is in the active state while heater 28 is in the inactive state in which heater 28 is shut down and/or withdrawn. Adhesive applicator 32 applies liquid adhesive, preferably a liquid thermoplastic material such as polypropylene, to surface 54 in sufficient quantity and at appropriate locations such that backing 60 of strip 58 bonds to surface 54 as strip 58 is wrapped about the core formed by strips 42 and 44 and about mandrel 14. Because pile fabric strip 58 is bonded to the core formed by strips 42 and 44 by liquid adhesive applied by applicator 32, surface 54 is not subjected to the high heats otherwise required to melt surface 54. As a result, pile fabric strip 58 is secured to the core formed by strips 42 and 44 with less heat distortion of the core formed by strips 42 and 44. Overall, apparatus 10, in control setting 120, produces a paint roller cover having a core 122 with better controlled, more consistent and more reliable bonds holding adjacent core strips 42, 44 together and having the pile fabric strip 58 secured to the core 122 with reduced heat distortion of the core 122.

FIG. 4A is a schematic fragmentary sectional view of roller cover 124 formed by apparatus 10 and control setting 120. FIG. 4A illustrates roller cover 124 prior to removal of roller cover 124 from mandrel 14. As shown by FIG. 4A, roller cover 124 includes strip 58 and core 122. As mentioned previously, strip 58 generally includes backing 60 and liquid absorbent or liquid carrying material 62. In the exemplary embodiment shown in FIG. 4A, at least one of backing 60 and material 62 includes a material having a different composition than that of the outer circumferential surface of core 122. More particularly, at least one of backing 60 and material 62 includes a material that is incompatible with at least one material forming the outer circumferential surface of core 122. In lieu of being partially or completely incompatible with one another, the materials forming backing 60 or material 62, and the material forming the outer circumferential surface of core 122, may have different melting and rigidity characteristics. For example, one of the surfaces of strip 58 (formed by backing 60 and material 62) and the outer circumferential surface of core 122 may include a material having a low melt point, allowing faster processing time, while the other of such surfaces includes a material having a higher melt point but greater rigidity so as to provide core 122 with greater structural strength. In each of the aforementioned circumstances, surfaces of strip 58 and core 122 either: (1) cannot fuse to one another, (2) fuse to one another with weaker bonds due to limited compatibility, or (3) may only be fused to one another with either (a) increased processing time resulting from the use of a more rigid material having a higher melt point or (b) structurally weaker roller cover resulting from the use of material having a higher melting point but less strength or rigidity. In the example shown in FIG. 3A, backing 60 comprises knit or woven polyester backing yarns. Material 62 comprises a pile of nylon face yarns which are looped through backing 60. Strip 60 is secured to core 122 by juncture 126.

Core 122 generally includes two layers or plies formed by strips 42 and 44 joined to one another by juncture 128. In the embodiment illustrated in FIG. 4A, strips 42 and 44 have opposing surfaces 48 and 52, respectively, including compatible material compositions such that surfaces 48 and 52 may be fused to one another. In the example shown in FIG. 4A, each of surfaces 48 and 52 of strips 42 and 44, respectively, include polypropylene having substantially similar melting point and rigidity characteristics.

Junctures 126 and 128 join strips 42, 44 and 58. Juncture 128 constitutes a fused region between surfaces 48 and 52. Although juncture 128 requires that the adjacent surfaces 48 and 52 of surfaces 42 and 44 be at least partially compatible, juncture 128 provides a single unitary structure between strip 42 and strip 44 along a single bonding site. Juncture 128 is formed by the application of heat to one or both of strips 42 and 44 so as to raise the temperatures to a point above the melting point of such adjacent materials. The application of heat is preferably performed by heater 28 (shown in FIG. 3).

Juncture 126 joins strip 58 to the outer circumferential surface of core 122. In contrast to juncture 128, juncture 126 constitutes a layer of adhesive sandwiched between the outer circumferential surface of core 122 and the lower surface of strip 58. Juncture 126 has two distinct bonding sites on its opposite sides. On one side, juncture 126 bonds with the outer circumferential surface 54 of strip 44 and on an opposite side, juncture 126 bonds with the lower surface of strip 58 formed by backing 60 and material 62. Juncture 126 preferably comprises an adhesive material that is at least partially compatible with the materials of both surface 54 and the opposite surface of strip 58. According to one exemplary embodiment, surfaces 54 and 55 of strip 58 shown in FIG. 4A include polypropylene and nylon, respectively. Juncture 126 includes a polypropylene based material having additives enabling the material to bond both with the polypropylene and the nylon contained in surfaces 54 and 55. An example of such a material is modified SANTOPRENE sold by Advanced Elastomer Systems under a license from Monsanto and is generically known as a thermoplastic rubber. Juncture 126 is formed between surfaces 54 and 55 by the application of adhesive material by adhesive applicator 32 shown in FIG. 4. Overall, junctures 126 and 128 enable roller cover 124 to have a core 122 formed from at least one ply of material having a more reliable, controlled and consistent solvent resistant bond due to its unitary structure while at the same time enabling core 122 to be joined to strip 158 having different and possibly incompatible materials depending upon the desired painting or coat applying characteristics of the resulting roller cover 124.

FIGS. 3A and 4A schematically illustrate two alternative roller covers 114 and 124 produced by apparatus 10 in different control settings 110 and 120. FIGS. 3A and 4A illustrate fused regions 118 and 126, respectively. For purposes of illustration, such fused regions 118 and 126 are illustrated as comprising generally uniform layers having distinct boundaries. However, as will be appreciated, because the fused regions 118 and 126 are composed solely of material contributed from adjacent layers, no distinct boundaries exist and the fused region may have a non-uniform thickness about the single bonding site where the adjacent layers melt together. In addition, the relative dimensions or proportions of junctures 116, 118, 126 and 128, as compared to the adjacent layers or strips, have been exaggerated for purposes of illustration.

FIG. 5 depicts apparatus 10 with controller 34 in control setting 130. In control setting 130, feeders 16, 18 lubricant applicator 22 and adhesive applicator 30 are in the active states while heaters 26 and 27 are in the inactive states. Lubricant applicator 22 applies lubricating fluid to surface 46 of strip 42. Adhesive applicator 30 applies liquid adhesive, preferably a thermoplastic liquid adhesive such as polypropylene, to outer surface 48 of strip 42. While the liquid adhesive applied to surface 48 is still in a liquid or bonding condition, feeder 18 wraps strip 44 over the liquid adhesive to bond strip 44 to strip 42 and to form a core 132 having a general thickness substantially equal to the thickness T1 of core 102 produced under control setting 100.

As further shown by FIG. 5, in control setting 130, adhesive applicator 32 is in the active state and heater 28 is in an inactive state in which heater 28 is shut down and/or withdrawn so as to not apply heat to surface 54 of strip 44 and the core. Adhesive applicator 32 applies liquid adhesive, preferably liquid thermoplastic adhesive such as polypropylene, to outer surface 54 of strip 44 in sufficient quantities and at appropriate locations such that the liquid adhesive bonds to both surface 54 and backing 60 to bond strip 58 to the core. Although apparatus 10 is capable of producing roller covers under control setting 130, control setting 130 produces roller covers having less consistent and reliable bonds between strips 42 and 44 and between pile fabric strip 58 and the underlying core formed by strips 42 and 44.

FIG. 6 depicts apparatus 10 with controller 34 in control setting 140. In control setting 140, feeder 16 (shown in FIG. 1), lubricant applicator 22 and adhesive applicator 30 are in the active states while lubricant applicator 24 (shown in FIG. 1) and heaters 26 and 27 are in the inactive states. In addition, feeder 18 is also in the inactive state such that only feeder 16 supplies a strip of core material, strip 42, to and about mandrel 14. In control setting 140, lubricant applicator 22 applies lubrication fluid to surface 46 of strip 42. Adhesive applicator 30 applies liquid adhesive, preferably liquid thermoplastic adhesive such as polypropylene, to outer surface 48 of strip 42. The adhesive applied to surface 48 by applicator 30 is preferably applied in sufficient amount and at appropriate locations such that backing 60 of strip 58 bonds to outer surface 48 to simultaneously form the core and the roller cover.

As further shown by FIG. 6, heater 28 and adhesive applicator 32 are in the inactive states under control setting 140. In lieu of adhesive applicator 30 applying liquid adhesive to outer surface 48 of strip 42, adhesive applicator 30 may be actuated to the inactive state by controller 34 (shown in FIG. 1) and adhesive applicator 32 may be actuated to the active state by controller 34. In such an alternative configuration under control setting 130, adhesive applicator 32 applies liquid adhesive, preferably a thermoplastic liquid adhesive such as polypropylene, to outer surface 48 of strip 42 prior to strip 58 being wrapped thereabout. Under control setting 140, apparatus 10 produces a paint roller cover having a core 142 with a reduced thickness. In particular, the core 142 has a thickness substantially equal to the thickness of strip 42. Such roller covers may be beneficial for low-cost applications in which the roller covers are not subject to great wear or in which the roller covers are discarded after minimal use.

FIG. 7 depicts apparatus 10 with controller 34 in control setting 150. In control setting 150, feeder 16 (shown in FIG. 1), lubricant applicator 22 and heater 26 are in the active states while feeder 18 (shown in FIG. 1), lubricant applicator 24 (shown in FIG. 1), heater 27 and adhesive applicator 30 are in the inactive states. Lubricant applicator 22 applies lubricating fluid to surface 46 of strip 42. Heater 26 applies heat to outer surface 48 of strip 42 to elevate the temperature of surface 48 so as to at least partially soften or melt surface 48 at appropriate locations and in sufficient measure such that backing 60 of strip 58 becomes fused and bonded to surface 48 to simultaneously form the core and the roller cover. Because heater 26 at least partially melts the thermoplastic material of surface 48 to bond strip 50 to strip 42, less bonding sites are required as compared to the use of liquid adhesive to bond strip 58 to strip 42. As a result, apparatus 10, in control setting 150, produces a roller cover having a single layer core 152 (shown in FIG. 7A) with a thickness T2 and a fabric pile strip 58 secured to the core 152 with a stronger and more durable bond as compared to roller covers produced under control setting 140.

As further shown by FIG. 7, in control setting 150, heater 28 and adhesive applicator 32 are both in the inactive states by being shut down and/or withdrawn. However, in lieu of heater 26 applying heat to outer surface 48 of strip 42, heater 28 may alternatively apply heat to surface 48 of strip 42 under control setting 150. The roller cover produced by apparatus 10 under control setting 150 is well suited for lower cost applications in which durability is of less concern and in which multiple repeated use of the roller cover is not anticipated.

FIG. 8 illustrates apparatus 10 with controller 34 (shown in FIG. 1) in control setting 160. In control setting 160, feeder 18 (shown in FIG. 1), lubricant applicator 24 and heater 28 are in the active states while feeder 16, lubricant applicator 22, heaters 26, 27 and adhesive applicators 30, 32 are in the inactive states. As shown by FIG. 8, lubricant applicator 24 applies lubricating fluid to inner surface 52 of strip 44 to facilitate movement of strip 44 along the outer circumferential surface of mandrel 14. Heater 28 applies heat to surface 54 to elevate a temperature of the thermoplastic material of surface 54 above its melting point to at least partially melt or soften surface 54 in sufficient quantities and at appropriate locations such that backing 60 of strip 58 becomes fused to surface 54 when wrapped about strip 44 and mandrel 14. Because apparatus 10, in control setting 160, at least partially melts surface 54 of strip 44 to bond pile fabric strip 58 thereto, apparatus 1 0 produces a paint roller cover having a single layer core 162 (shown in FIG. 8A) with an even further reduced thickness T3 and having a pile fabric strip 58 secured to the core 162 with a more controlled, reliable and consistent bond as compared to the bonds formed by applying liquid adhesive. Because core 162 has an even further reduced thickness T3, substantially equal to the thickness of strip 44, the paint roller produced by apparatus 10 under control setting 160 is best suited for extremely inexpensive applications where durability and reuse are less important.

Figure 9:
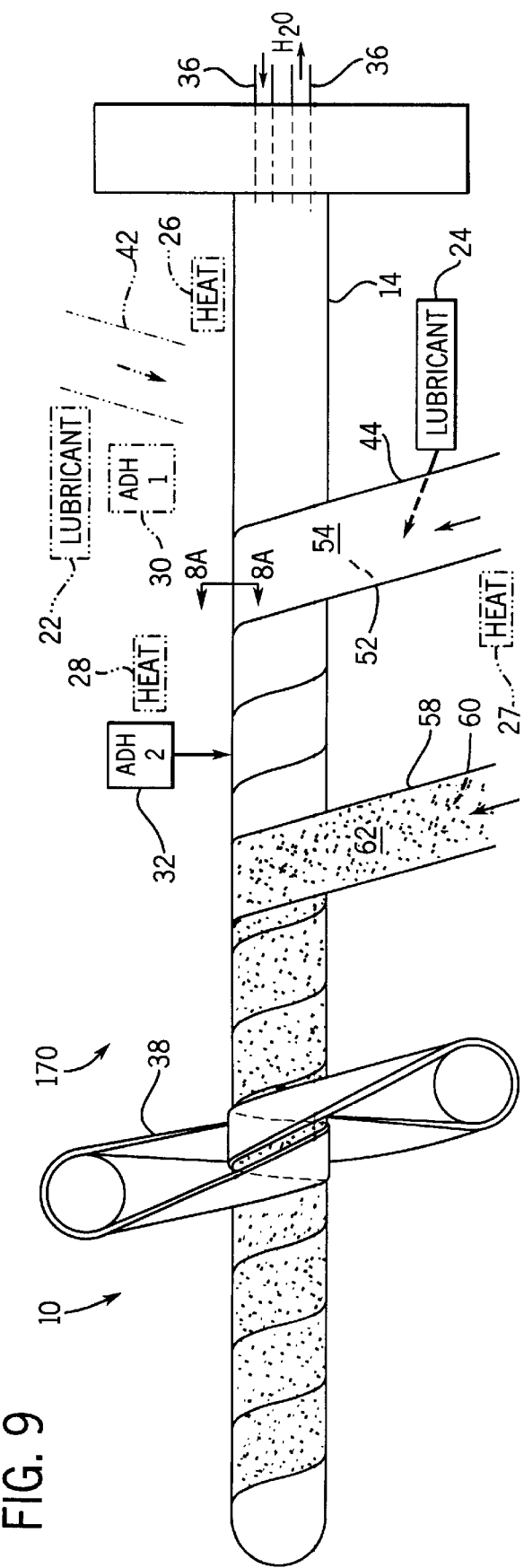
FIG. 9 is a top elevational view of the apparatus of FIG. 1 in an eighth control setting.

FIG. 9 depicts apparatus 10 with controller 34 in control setting 170. Control setting 170 is substantially similar to control setting 160 except that adhesive applicator 32 is in the active state while heater 28 is in the inactive state. Under such an alternative control setting, adhesive applicator 32 applies liquid adhesive, preferably liquid thermoplastic adhesive such as polypropylene, to surface 54 of strip 44 in sufficient quantity and at appropriate locations such that backing 60 of pile fabric strip 58 bonds to surface 54 to simultaneously form a single layer core having a thickness T3 similar to core 162 and a paint roller cover. Because apparatus 10, under control setting 170, utilizes adhesive applicator 32 to apply liquid adhesive to bond pile fabric strip 58 to core strip 44, apparatus 10 subjects core strip 44 to less heat. As a result, the single layer core formed by strip 44 is less subject to heat distortion. Similar to apparatus 10 under control setting 160, apparatus 10 under control setting 170 produces a paint roller cover especially suited for extremely low cost applications where durability and repeated use are not important.

FIG. 9A is a fragmentary side elevational view of an alternative roller cover core 182 formed by a slightly modified apparatus 10 in control setting 170. Similar to core 172 of FIG. 9, core 182 is composed of a single strip 44 of core material. However, unlike core 172 where strip 44 is wrapped about mandrel 14 such that opposing adjacent edges of strip 44 are in abutting end-to-end contact with one another or are axially spaced from one another about mandrel 14, core 182 is formed by adjusting the positioning and angle of feeder 18 (shown in FIG. 1) such that opposing adjacent edges of edges 188, 190 extend about mandrel 14 (shown in FIG. 1) in an overlapping relationship. In the exemplary embodiments illustrated in FIG. 9A, edge 190 overlaps edge 188. Although such a construction creates a slight bump or ridge along the outer circumferential surface of core 182, this ridge is relatively negligible after heat or adhesive is applied to the outer surface of core 182 and/or after strip 58 is wrapped about and secured to core 182. After core 182 is formed as shown in FIG. 9A, adhesive applicator 32 applies adhesive to the outer surface of strip 44 and strip 58 is further positioned about strip 44 in a manner substantially identical to that shown with respect to control setting 170 in FIG. 9. Alternatively, apparatus 10 may be configured such that heater 28 applies heat to the outer circumferential surface of core 182 at selected locations and to an extent such that core 182 is joined to strip 58 as shown and described with respect to control setting 160 in FIG. 8. As will be appreciated, the same method of wrapping strip 44 about mandrel 14 such that opposite adjacent edges of strip 44 overlap one another may alternatively be used with strip 42.

According to yet another alternative embodiment, the overlapping portions 192 of strip 44 are preferably bonded to one another prior to the positioning of strip 58 about core 182. In one embodiment, apparatus 10 includes a heater that applies heat to either or both of the outer facing surface 193 of portion 192 or the inner facing surface 195 of portion 192 to elevate the temperature of at least one of the surfaces to a point above the melting point of the material such that the outer facing surface 193 and the inner facing surface 195 fuse to one another in those applications where the outward facing surfaces and the inward facing surfaces of portion 192 include a thermoplastic material. In another embodiment, apparatus 10 includes an adhesive applicator configured to apply adhesive at least between the outer facing surface 193 and the inner facing surface 195 of portion 192. The adhesive applied is preferably solvent resistant and preferably fuses to the outer facing surface 193 and the inner facing surface 195 of portion 192. Alternatively, other adhesive materials may be employed. In applications where strip 44 has portions 192 having an outer facing surface 193 composed of a first material and an inner facing surface 195 composed of a second different or even incompatible material, the adhesive is preferably compatible with each of different materials. In yet another alternative embodiment, the outer facing surfaces 193 (i.e., the surfaces of strip 44 facing away from the axial center line of mandrel 14) and the inward facing surfaces 195 (i.e., the surfaces facing towards the axial center line of mandrel 14) of overlapping portions 192 are welded together such as by heat welding or sonic welding. Alternatively, core 182 may be formed by fusing, adhering or welding either or both of edges 188 and 190 to the adjacent underlying or overlapping portion of strip 44 so as to form junctures 194, 196 as shown in FIG. 9B.

Figure 10:
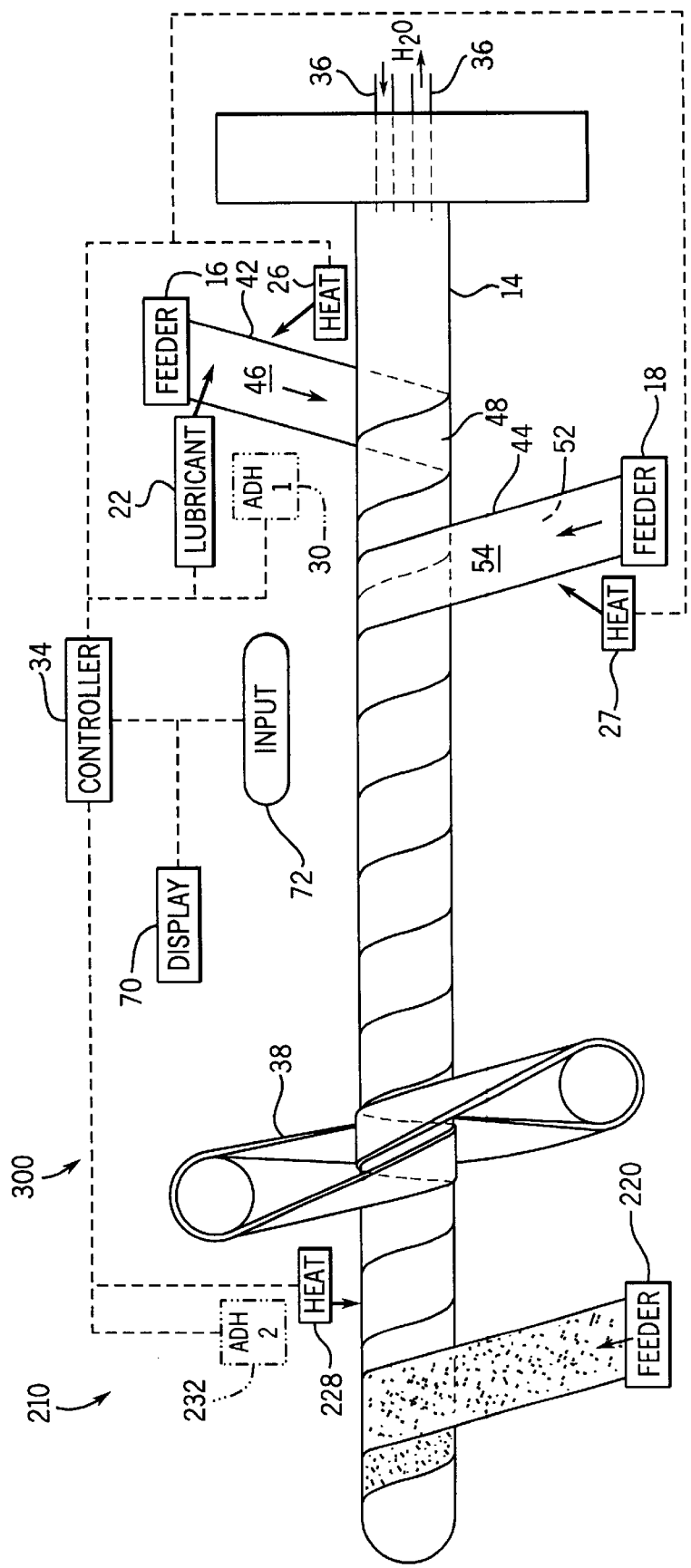
FIG. 10 is a top elevational view schematically illustrating an alternative embodiment of the apparatus of FIG. 1 in a first control setting.
Figure 11:
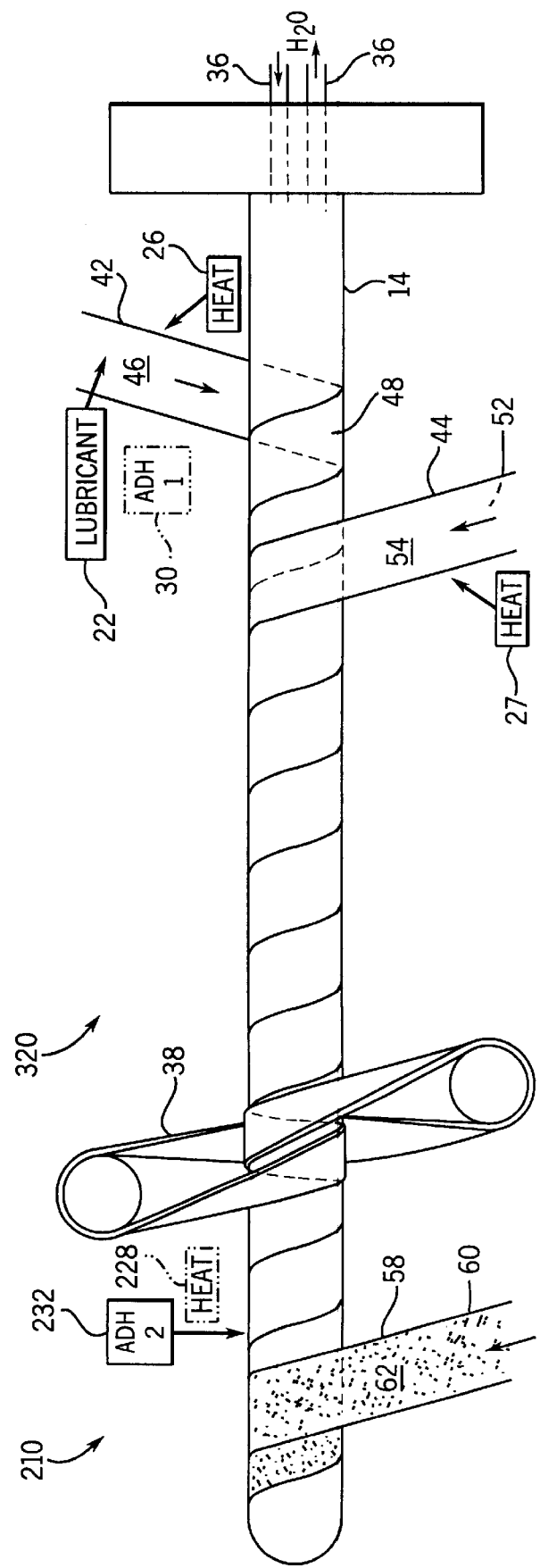
FIG. 11 is a top elevational view of the apparatus of FIG. 10 in a second control setting.

FIGS. 10 and 11 illustrate apparatus 210 in control settings 300 and 320, respectively. Apparatus 210 is similar to apparatus 10 except that apparatus 210 includes heater 228 and adhesive applicator 232 in lieu of heater 28 and adhesive applicator 32. For ease of illustration, those remaining components of apparatus 210 which correspond to apparatus 10 are numbered similarly. Heater 228 and adhesive applicator 232 are substantially identical to heater 28 and applicator 32 except that heater 228 and adhesive applicator 232 are located proximate to mandrel 14 on an opposite axial side of mandrel 14 with respect to Ford drive 38. When controller 34 is in control setting 300 shown in FIG. 10, apparatus 210 produces paint roller covers substantially identical to apparatus 10 under control setting 100 except that while adhesive applicator 232 is in the inactive state, heater 228 applies heat to surface 54 of strip 44 to at least partially melt the thermoplastic material of surface 54 after surface 54 has been engaged by the belts of drive 38 to rotatably drive the core consisting of strips 42 and 44 axially along mandrel 14. Once surface 54 has been sufficiently melted, feeder 220 supplies fabric pile strip 58 to mandrel 14 such that strip 58 spirally wraps about mandrel 14 and over strip 44. As a result, backing 60 of strip 58 becomes fused to surface 54 and the core formed by strips 42 and 44.

As shown in FIG. 11, apparatus 210 produces paint roller covers under control setting 320 in a substantially similar fashion to apparatus 10 under control setting 120 except that while heater 228 is in the inactive state, adhesive applicator 232 applies liquid adhesive, preferably a liquid thermoplastic adhesive such as polypropylene, to surface 54 of strip 44 after surface 54 has already been engaged by the belts of drive 38 to axially move the core formed by strips 42 and 44 along mandrel 14. Adhesive applicator 232 applies a sufficient quantity of liquid adhesive at appropriate locations to surface 54 such that backing 60 of pile fabric strip 58 bonds thereto. Although not specifically illustrated, appropriate input to controller 34 may selectively actuate components of apparatus 210 such that apparatus 210 produces paint roller covers in a fashion substantially similar to apparatus 10 also under control settings 110 and 130 shown in FIGS. 3 and 5, respectively.

As previously set forth, there has been a continuing need for a method and apparatus for producing a solvent resistant paint roller cover with minimal heat distortion and with more reliable bonding between the fabric pile and the underlying core. Apparatus 10 and 210 meet this need. In addition, apparatus 10 and 210 provide superior flexibility in the production of paint roller covers having different characteristics with a single apparatus. For example, in control setting 110, apparatus 10 produces a paint roller cover having a multi-layer core, having a core formed from multiple strips bonded to one another with reduced heat distortion and having a fabric pile strip fused to the core with stronger bonds. In control setting 110, apparatus 10 is extremely versatile with respect to qualities of the core. In particular, apparatus 10 enables varying adhesives that are compatible with different materials to be employed such that the core can be formed from different plies having different qualities, materials, mixtures of materials or thicknesses to best meet the desired performance and cost requirements for the core. At the same time, apparatus 10 in control setting 110 secures the fabric pile strip to the core in such a manner that the juncture between the fabric pile strip and the underlying core is simpler, more unitary and more reliable as to solvent resistance, resulting in less potential scrap.

In control setting 120, apparatus 10 produces a paint roller cover having a multi-layer core, having a core formed from multiple strips of core material fused to one another with more reliable, controlled and consistent bonds and having a fabric pile strip bonded to the core with reduced heat distortion. Apparatus 10 in control setting 120 reduces potential scrap during the manufacture of the core by joining adjacent plies of the core in a manner such that the juncture of the plies is simpler, more unitary and is more reliable with respect to solvent resistance. At the same time, apparatus 10 in control setting 120 is extremely versatile in that it allows the use of different adhesives which are compatible with different core materials and different fabric pile materials to provide more reliable and consistent bonds between the fabric pile strip and the underlying core when the chosen fabric pile strip would otherwise be incompatible with the outer material of the core. For example, specialty fabrics such as vinyl and nylon are less compatible with polypropylene. However, apparatus 10 in control setting 120 enables the use of adhesives having specific modifiers allowing the adhesive to bond to both the polypropylene material of a core and the nylon or vinyl material of the fabric pile strip.

In addition to being capable of producing higher quality paint roller covers having stronger bonds and reduced heat distortion, apparatus 10 also provides the operator with greater manufacturing flexibility to switch between the production of different paint roller covers having different desired characteristics. For example, by simply adjusting the control settings of controller 34, an operator may quickly and easily produce paint roller covers having different core thicknesses T1, T2, and T3 as shown in FIGS. 2A, 7A and 8A, respectively. Such flexibility enables the production of paint rollers with apparatus 10 to quickly and economically accommodate changes in demand and production requirements. Moreover, apparatus 10 may be quickly and easily adjusted between the different control settings as needed to accommodate the use of different core materials, pile fabric backing materials and liquid adhesives. For example, some core materials, such as vinyl, acrylic and nylon, are extremely difficult to form bonds by melting and fusing the plies together. However, apparatus 10 enables an operator to easily switch to control setting 110 to accommodate the use of such core materials. Switching between different control settings is facilitated by controller 34 that allows an operator to select a pre-determined setting for producing a selected paint roller with desired characteristics by inputting a selection. Controller 34 automatically actuates the lubricant applicators, heaters and adhesive applicators to the appropriate active and inactive states, saving the operator time and confusion. As noted above, controller 34 preferably additionally provides on-screen instructions for manually actuating feeders 16, 18 and possibly feeder 20 between active and inactive states to further avoid operator confusion or production mistakes. In some applications, controller 34 is connected to a central controller that is coupled to multiple apparatus 10 and that generates control signals for actuating the multiple controllers 34 between the various control settings based upon overall production demands or production scheduling to further improve production efficiency and timeliness. Although less desirable, controller 34 may be eliminated, whereby lubricant applicators 22, 24; heaters 26, 27, 28; and adhesive applicators 30, 32 are manually actuated between the active and inactive states.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An apparatus for making a paint roller, the apparatus comprising:

a mandrel;

a first core material strip feeder actuatable between a first active state in which the feeder feeds a first strip of core material about the mandrel and a second inactive state;

a second core material strip feeder actuatable between a first active state in which the feeder feeds a second strip of core material about the mandrel and a second inactive state;

a fabric cover strip feeder adjacent the mandrel and configured to feed a strip of fabric cover material about the mandrel and about at least one of the first and second strips of core material;

a first heater actuatable between a first active state in which the first heater applies heat to an outer surface of the first strip of core material and a second inactive state;

a second heater actuatable between a first active state in which the second heater applies heat to an outer surface of the second strip of core material and a second inactive state;

a first liquid adhesive applicator actuatable between a first active state in which liquid adhesive is applied to an outer surface of the first strip and a second inactive state; and a second liquid adhesive applicator actuatable between a first active state in which liquid adhesive is applied to an outer surface of the second strip of core material and a second inactive state, whereby the apparatus may produce paint rollers having varying core thicknesses and varying bonded ply characteristics by selective actuation of the first and second strip feeders, the first and second heaters and the first and second adhesive applicators.

2. The apparatus of claim 1 including a controller coupled to the first heater and the first liquid adhesive applicator, wherein the controller is configured to generate at least one control signal and wherein the first heater and the first liquid adhesive applicator actuate between the active states and the inactive states in response to the at least one control signal.

3. The apparatus of claim 1 including a controller coupled to the second heater and the second liquid adhesive applicator, wherein the controller is configured to generate at least one control signal and wherein the first heater and the first liquid applicator actuate between the active states and the inactive states in response to the at least one control signal.

4. The apparatus of claim 1 including a controller coupled to the first heater, the second heater, the first liquid adhesive applicator and the second liquid adhesive applicator, wherein the controller is configured to generate at least one control signal and wherein the first heater, the second heater, the first liquid adhesive applicator and the second liquid adhesive applicator actuate between the active states and the inactive states in response to the at least one control signal.

5. The apparatus of claim 4, wherein the controller is coupled to the first core material strip feeder and the second core material strip feeder and wherein the first core material strip feeder and the second core material strip feeder actuate between the active states and inactive states in response to the at least one control signal.

6. The apparatus of claim 1 including:

a first lubricant applicator actuatable between a first active state in which the first lubricant supply applies a lubricant to an inner surface of the first strip of core material and a second inactive state;

a second lubricant applicator actuatable between a first active state in which the second lubricant supply applies a lubricant to an inner surface of the second strip of core material and a second inactive state.

7. The apparatus of claim 1 wherein the first and second liquid adhesive applicators are configured to apply a thermoplastic adhesive when in the first active state.

8. The apparatus of claim 1 wherein the first and second core material strip feeders are configured to feed first and second strips of core material, respectively, each of the first and second strips having an outer surface including a thermoplastic material and wherein the first and second heaters are configured to apply heat to the outer surface of the first and second strips to elevate a temperature of the outer surface of the first and second strips above a melting point of the thermoplastic material.

9. An apparatus for making a paint roller, the apparatus comprising:

a mandrel;

a first core material strip feeder configured to feed a first strip of core material about the mandrel;

a second core material strip feeder configured to feed a second strip of core material about the mandrel;

a fabric cover strip feeder adjacent the mandrel and configured to feed a strip of fabric cover material about the mandrel and about at least one of the first and second strips of core material;

a first heater actuatable between a first active state in which the first heater applies heat to an outer surface of the first strip of core material and a second inactive state;

a second heater actuatable between a first active state in which the second heater applies heat to an outer surface of the second strip of core material and a second inactive state;

a first liquid adhesive applicator actuatable between a first active state in which liquid adhesive is applied to an outer surface of the first strip and a second inactive state; and a second liquid adhesive applicator actuatable between a first active state in which liquid adhesive is applied to an outer surface of the second strip of core material and a second inactive state, whereby the apparatus may produce paint rollers having varying core thicknesses and varying bonded ply characteristics by selective actuation of the first and second heaters and the first and second adhesive applicators.

* * * * *